(12) United States Patent
McCullen et al.

(10) Patent No.: US 6,886,797 B2
(45) Date of Patent: May 3, 2005

(54) SEAT TRACK ASSEMBLY

(75) Inventors: Keith McCullen, Shelby Township, MI (US); Keith Hensley, Farmington Hills, MI (US); Randy Gage, Troy, MI (US); Sunil K. Gupte, Livonia, MI (US); Neil G. Goodbred, Northville, MI (US); Tony Centi, Grosse Ile, MI (US); Wee Gam, Troy, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/286,347

(22) Filed: Nov. 1, 2002

(65) Prior Publication Data

US 2004/0089785 A1 May 13, 2004

Related U.S. Application Data

(60) Provisional application No. 60/336,536, filed on Nov. 1, 2001.

(51) Int. Cl.$^7$ ............................................. F16M 13/00
(52) U.S. Cl. ....................................... 248/429; 248/424
(58) Field of Search ................................. 248/429, 430, 248/424; 296/65.13, 65.14; 297/344.11, 344.13

(56) References Cited

U.S. PATENT DOCUMENTS

| | | | |
|---|---|---|---|
| 3,930,632 A | 1/1976 | Shigeta et al. ............... 248/429 |
| 4,088,378 A | 5/1978 | Pallant et al. ............... 308/3 R |
| 4,487,459 A | * 12/1984 | Rees ........................... 248/429 |
| 4,556,186 A | * 12/1985 | Langmesser, Jr. et al. .. 248/429 |
| 4,811,925 A | * 3/1989 | Fujita et al. ................. 248/430 |
| 4,949,931 A | 8/1990 | Fujiwara et al. ............. 248/429 |
| 5,213,300 A | 5/1993 | Rees ........................... 248/429 |
| 5,445,354 A | 8/1995 | Gauger et al. ............... 248/429 |
| 5,575,449 A | 11/1996 | Shinbori et al. ............. 248/429 |
| 5,575,564 A | 11/1996 | Harmon et al. ............... 384/34 |
| 5,741,000 A | 4/1998 | Goodbred .................... 248/430 |
| 5,746,409 A | 5/1998 | Rees ........................... 248/422 |
| 5,876,085 A | 3/1999 | Hill .......................... 296/65.02 |
| 5,915,660 A | 6/1999 | Kanda ......................... 248/430 |
| 6,056,257 A | 5/2000 | Jaisle et al. ................. 248/424 |
| 6,105,921 A | 8/2000 | Carrig et al. ................ 248/429 |
| 6,234,553 B1 | 5/2001 | Eschelbach et al. ..... 296/65.14 |
| 6,499,712 B1 | * 12/2002 | Clark et al. ................. 248/429 |

* cited by examiner

*Primary Examiner*—Gwendolyn Baxter
(74) *Attorney, Agent, or Firm*—Bill C. Panagos

(57) ABSTRACT

A seat track assembly having a first track member and a second track member that defines a first recess. A single slide member is disposed between the first and second track members. The slide member additionally has an integral flange extending therefrom wherein the flange is adapted to engage the first recess for fixing the slide member relative to the second track member. The sliding member has a contact surface engaging the second track member and a sliding surface in sliding engagement with the first track member.

20 Claims, 4 Drawing Sheets

SEAT TRACK ASSEMBLY

CROSS REFERENCE TO RELATED APPLICATIONS

This application claims the benefit of U.S. Provisional Application No. 60/336,536 filed Nov. 1, 2001.

FIELD OF THE INVENTION

This invention relates in general to a seat track assembly for a vehicle, and in particular to a seat track assembly having a slide member positioned between a lower and upper slide track that is fixed to one of the tracks and slides relative to the other track.

BACKGROUND OF INVENTION

Most vehicle seats, and in particular, passenger vehicles are generally provided with adjustment mechanisms to allow the occupant to position the seat for optimal comfort. The seats include a seat back which is typically movably mounted to a seat bottom by a recliner mechanism to adjust the angle of the seat back relative to the seat bottom. The seats can also include mechanisms that allow movement of the seat forward and backward (fore and aft) relative to the floor of the vehicle. To accomplish this, vehicle seats are mounted on seat track assemblies that are in turn supported on the vehicle frame. Seat track assemblies conventionally include an upper seat track and a lower seat track with a low-friction member or surface between the tracks. The seat bottom is typically connected to the upper seat track and can slidably move relative to the lower track by sliding on the low friction surface. The lower seat track is generally fixed to the vehicle frame or floor to maintain the relative position of the seat to the vehicle.

The use of a low friction surface allows the seat and upper seat track to slide more easily on the lower seat track. It is commonly known to use bearing means, such as roller bearings or plastic slide members, as low-friction members between the upper and lower tracks to function as a bushing. To facilitate movement between tracks, it is helpful to attach the slide member to a first track and allow the second track to slide relative to the first track.

It is desirable to provide a seat track assembly that effectively retains the slide within the seat track assembly without increasing cost or efficiency during the assembly process. Also, it is desirable for the seat track assembly to slide easily and with reduced friction between the track surfaces.

DETAILED DESCRIPTION OF THE PREFERRED EMBODIMENT

Figure 1:
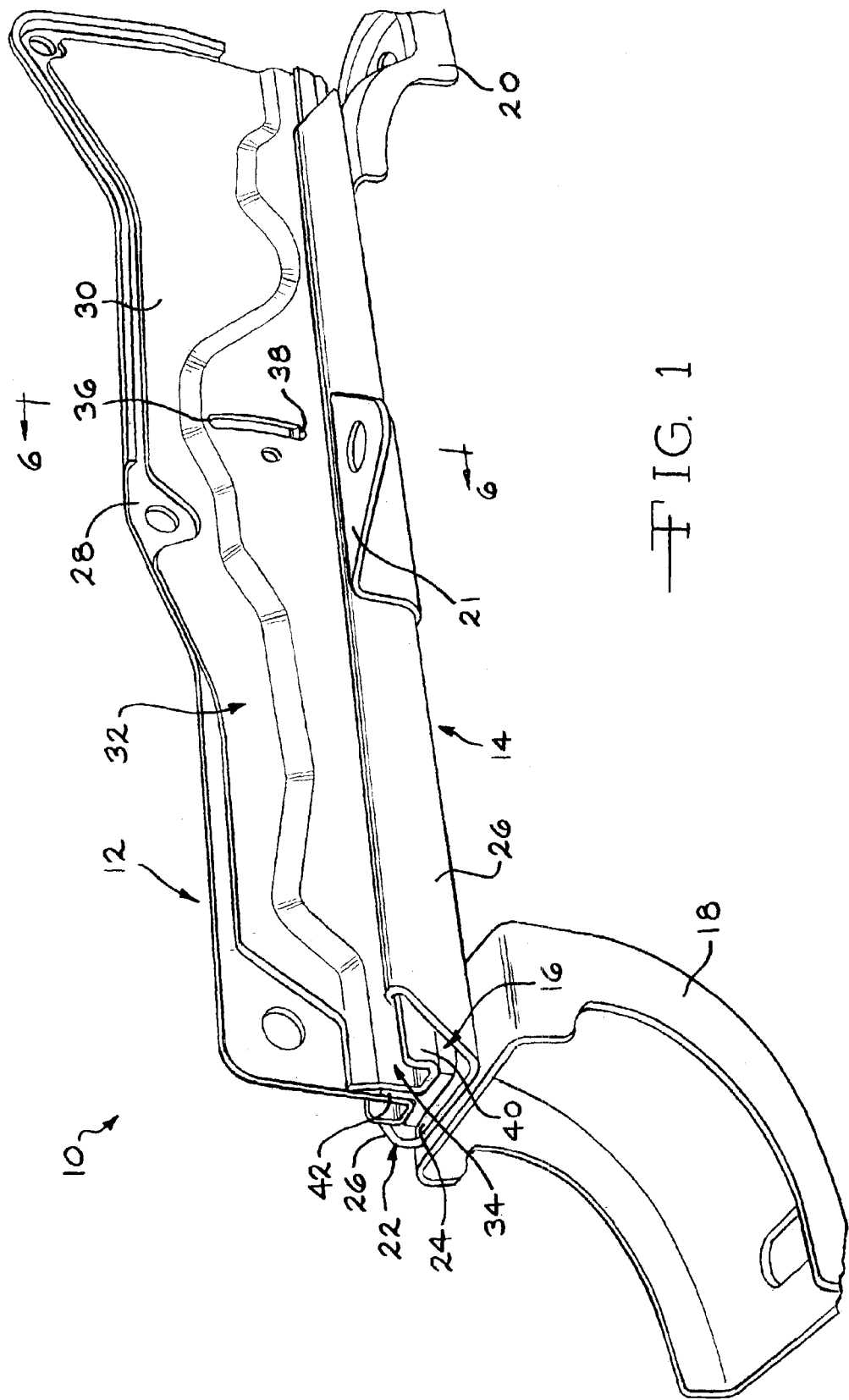
FIG. 1 is a perspective view of a portion of a vehicle seat depicting a seat track assembly in accordance with this invention.

Referring now to the drawings, there is illustrated in FIG. 1 a seat track assembly, indicated generally at 10. The seat track assembly 10 generally includes an upper track member 12, a lower track member 14, and a slide member 16 disposed between the track members 12 and 14 for providing a generally low frictional sliding engagement therebetween, as will be explained in detail below. The seat track assembly 10 provides fore and aft directional adjustment for a vehicle seat (not shown) relative to the floor of the vehicle in which the seat track assembly 10 is installed. Preferably, the vehicle seat has a pair of seat track assemblies 10, one for each side of the seat. Of course, the seat can include a single seat track assembly 10 preferably located near the longitudinal center of the seat. It should also be understood that the seat track assembly 10 may be oriented in a position other than that shown in the figures. For example, as viewing FIG. 6, the seat track assembly 10 could be oriented in a position 90 degrees offset from the position shown in FIG. 6.

The upper seat track member 12 can be connected to a vehicle seat (not shown) by any conventional means. For example, the upper seat track member 12 can be connected to a seat bottom (not shown). The lower seat track 14 can be fixed to the vehicle frame or floor (not shown) by any conventional means. The slide member 16 is preferably fixed relative to the upper seat track member 12 such that sliding movement of the upper seat track member 12 causes the slide member 16 to move with the upper seat track member 12. The means of fixing the slide member 16 with the upper seat track member 12 is described in further detail below. Adjustment of the position of the vehicle seat by the occupant will generally cause the upper seat track member 12 to slide with the slide member 16 relative to the lower seat track member 14. Of course, the seat track assembly 10 could be configured such that the slide member 16 is fixed relative to the lower seat track member 14.

Figure 6:
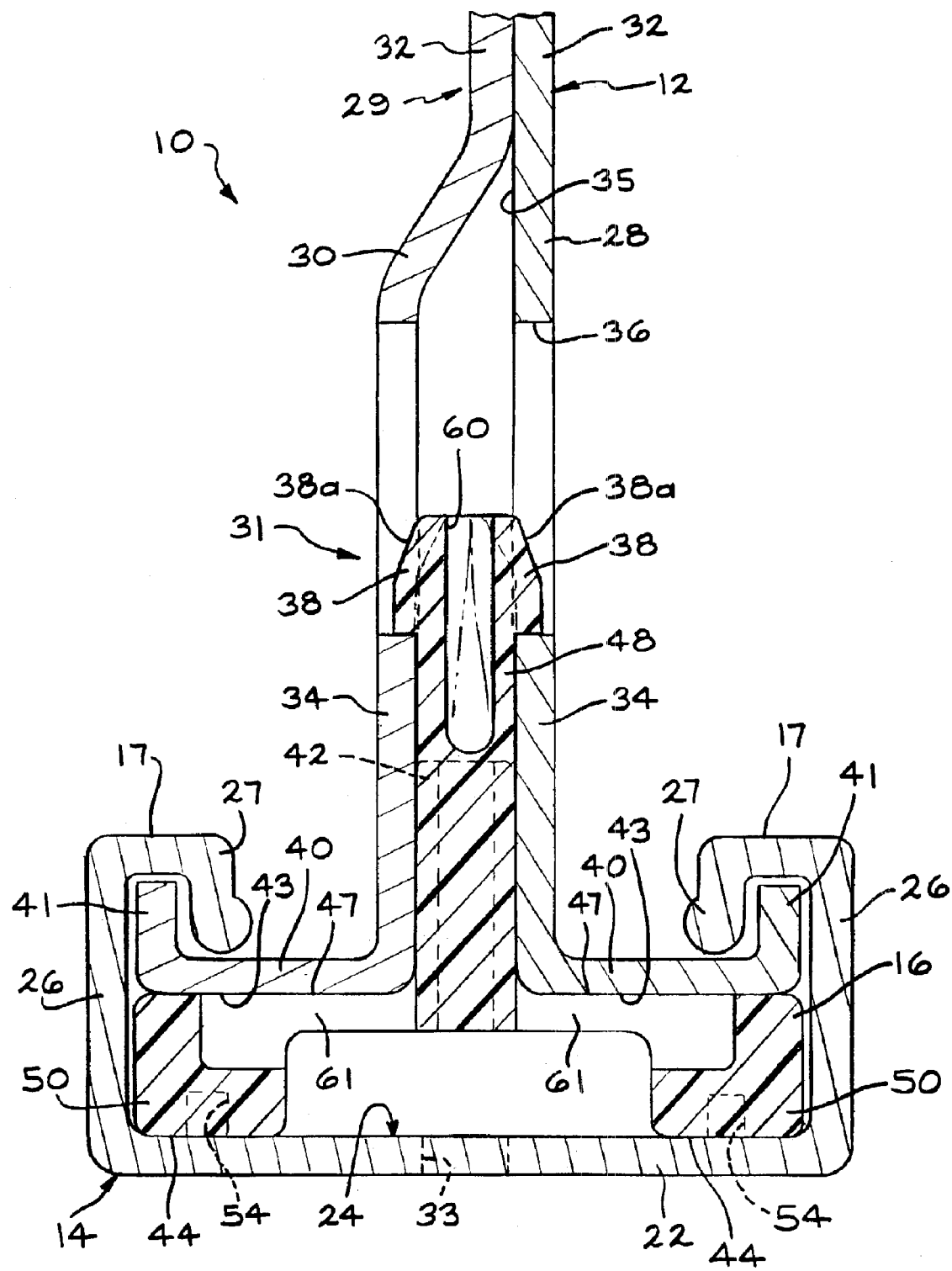
FIG. 6 is a partial cross-sectional view of the seat track assembly taken along Lines 6—6 in FIG. 1.

The lower seat track member 14 has a pair of mounting structures or feet 18, 20, and 21 that are adapted to be connected to the vehicle frame. Any suitable mounting structures can be used for attaching the lower seat track member 14 to the vehicle. The lower seat track member 14 is elongated and generally has a continuous cross-sectional shape. As best shown in FIG. 6, the lower seat track member 14 includes a generally flat horizontally extending body portion 22 having a substantially flat sliding surface 24. A pair of arms 26 extend upwardly from the ends of the body portion 22. The arms 26 preferably include upper portions 27 which are curved or for hook portions which cooperate with portions of the upper seat track member 12 to interlock the track members 12 and 14 so that they are restricted from pulling apart from one another when opposing vertical forces act on the members 12 and 14, respectively, such as during a vehicle impact. The lower seat track member 14 may include a plurality of slots 33 formed therein along the length of the body portion 22 for receiving fingers of a latch or lock mechanism (not shown) connected to the upper seat track member 12 for maintaining a locked relationship between the track members 12 and 14.

The upper seat track 12 has a generally elongated shape and extends the length of the lower seat track member 14. Preferably, the upper seat track member 12 is made of two shaped of stamped plates 28 and 30, but can be formed in any suitable manner. As shown in FIG. 6, the plates 28, 30 preferably are formed having mating portions 32 and spaced apart portions 34. The plates 28, 30 are preferably joined about the mating portions 32 by any conventional means, such as welding or by fasteners. Each plate 28, 30 includes opposed recesses 36 formed therein. The recess 36 can have any suitable shape, and the embodiment of the track assembly 10 illustrated in FIG. 1 discloses elongated arcuate shaped recess 36 which may receive other components of the seat (not shown). However it is understood that the invention can be practiced with a single recess or multiple recesses and the recesses 36 can have any suitable shape. The recesses 36 can be through holes or extend only partially through the side wall of the plates 28, 30. The recesses 36 are adapted to receive a protrusion integrally formed on the slide member 16 for attaching the slide member 16 to the upper seat track member 12, as is described below. The spaced relationship of the spaced apart portions 34 defines a recess 35 formed in the upper seat track member 12. The recess 35 is preferably shaped such that a portion of the slide member 16 can fit within the spaced portion 34, and more preferably fits in a snug or frictional fit. Although the recess 35 is defined by the spaced relationship between the portions of the plates 28, 30, the upper seat track member 12 can have any suitable configuration, such as a single unitary component having a groove formed therein to define the recess 35. Each end of the spaced portions 34 of the upper track member 12 has a horizontally extending flanged portion 40 including a pair of upwardly curved arms 41 that are received in hook portions of the upper portions 27 of the lower seat track member 14 to interlock the track members 12 and 14. The flanged portions 40 of the upper track member 12 define contact surfaces 43 that generally abut the slide member 16, as will be described further below.

Illustrated in FIGS. 2 through 6, is the slide member 16 disposed between the track members 12 and 14. The slide member 16 has a longitudinally extending strip or base portion 46 disposed between the body portion 22 and arms 26 of the lower seat track member 14 and the flanged portions 40 of the upper seat track member 12. The slide member 16 further includes a flange portion 42 extending generally vertically and perpendicularly from and upper surface of the base portion 46. The slide member 16 generally has an inverted T-shaped cross-section defined by the base portion 46 and the flange portion 42. The flange portion 42 separates the upper surface of the base portion 46 into a pair of contacting surfaces 47 one on either side of the flange portion 42. The contacting surfaces 47 of the flange portion 42 contact and abut against the contact surfaces 43 of the upper seat track member 12. Since the slide member 16 is preferably fixed relative to the upper seat track member 12, the contact surfaces 43 and 47 are generally fixed relative to one another. Generally, vertically oriented forces imparted on the upper seat track member 12 will be transmitted to the slide member 16 via the contact surfaces 43 and 47.

Figure 3:
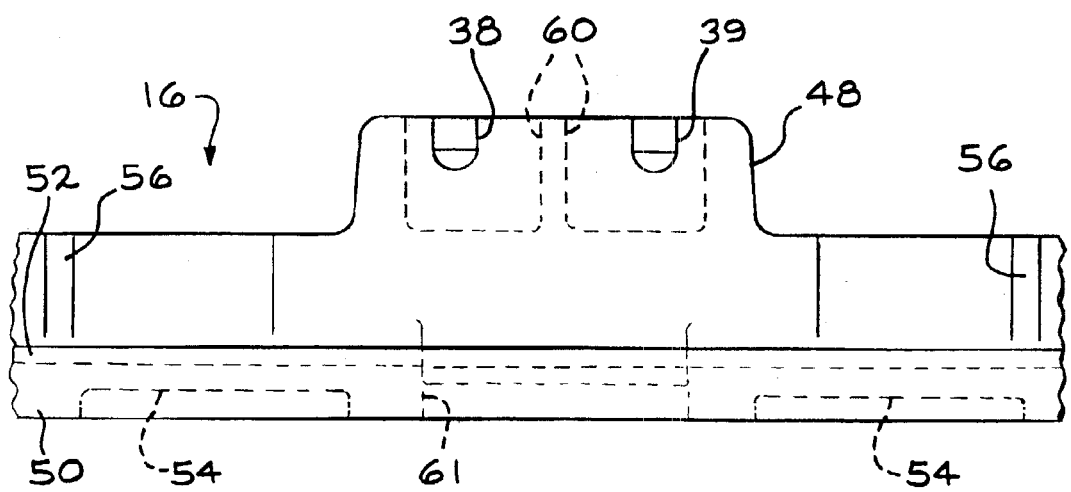
FIG. 3 is a side elevation view of the portion of the track slide member illustrated in FIG. 2.
Figure 5:
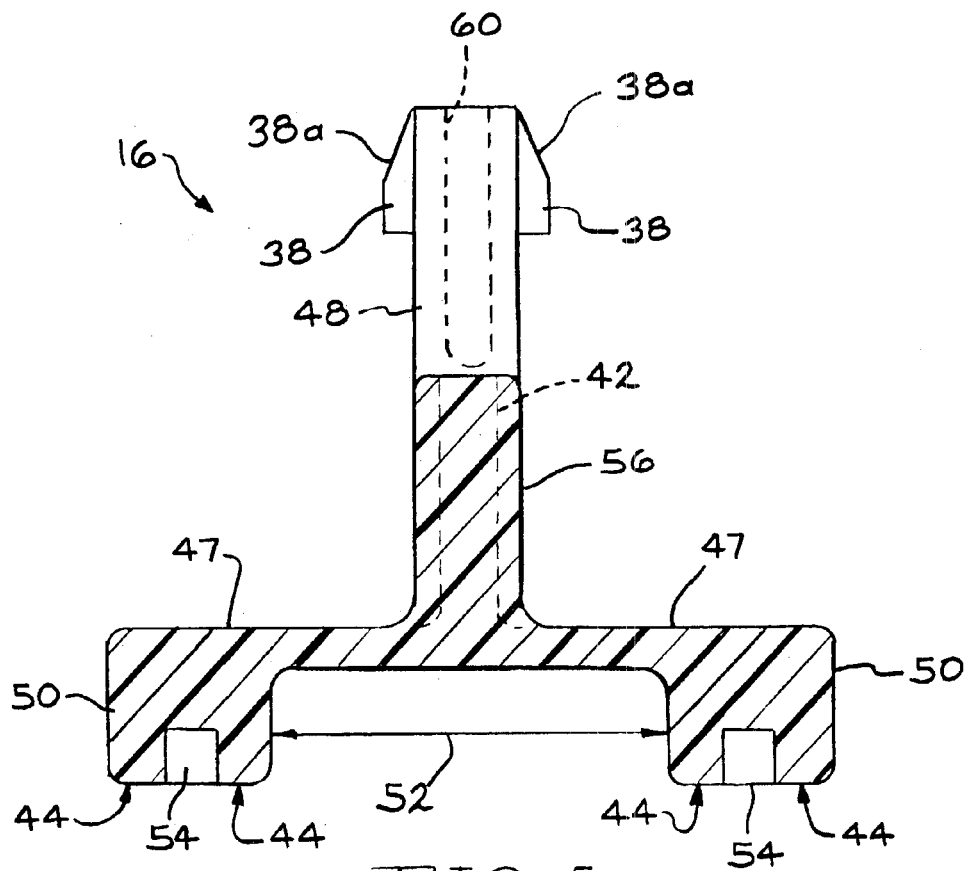
FIG. 5 is a cross-sectional view of the track slide member taken along Lines 5—5 in FIG. 4.

Extending upwardly from the flange portion 42 about a centrally located region of the slide member 16 is a stepped portion 48, the reason for which will be explained below. Located on the bottom of the base portion 46, is a sliding surface 44. The sliding surface 44 is the surface that slidingly engages the sliding surface 24 of the lower track member 14 for sliding movement therewith. The bottom of the body portion 46 of the slide member 16 preferably is shaped such that the sliding surface 44 has a pair of longitudinally extending feet 50 that establish a pair of sliding surfaces with the sliding surface 24 of the lower track member 14. The feet 50 define a space 52 between each other such that the pair of sliding surfaces 44 have a reduced surface area thereby reducing the amount of friction that the two bearing or sliding surfaces 44 and 24 have with each other. Such a design also causes less material to be used for the sliding member 16, thereby reducing the cost of the apparatus 10. In a preferred embodiment, the longitudinal portions of each foot 50 also have cut-out areas 54, as best shown in FIGS. 3 and 5, to even further reduce the frictional contact area between the sliding member 16 and the lower seat track member 14. Generally, vertically oriented forces imparted on the lower seat track member 14 will be transmitted to the slide member 16 via the sliding surfaces 24 and 44.

The components of the seat track assembly 10 can be made of any suitable materials which provide sufficient strength to support the seat and permit relatively easy fore and aft adjustment. Preferably, the upper and lower seat track members 12 and 14 are made of metal, such as steel, and can be formed from shaped or stamped sheets. The sliding member 16 is preferably made of plastic or other suitable material having a relatively low friction of coefficient to reduce the frictional forces between the contact sliding surfaces 24 and 44. The sliding member 16 should be able to withstand a relatively high load of compressive forces acting thereon. For example, during an impact situation, separation forces may act on the seat track assembly 10 wherein one of the ends of the upper seat track member 12 is being compressed against the respective end of the lower seat track assembly 14, and the other end of the upper seat track member 12 is being pulled away from the respective end of the lower seat track member 14 via the interlocking portions 27 and 41. The configuration of the seat track assembly 10 is such that the sliding member 16 generally takes only compressive forces during high load situations, and is therefore not under high tensile loads. As will be described below, the flange portion 42 generally functions to retain the slide member 16 onto the upper seat track member 12 and not to absorb high tensile loads.

Extending generally perpendicularly from the center of the top of the base portion 46 is the flange portion 42. The flange portion 42 is disposed in the recess 35 of the upper seat track member 12. Preferably, the flange portion 42 is longitudinally extending along the full length of the base portion 46. However, the flange portion 42 does not have to extend the full length of the base portion 46 in order for the invention to be operable. The flange portion 42 preferably has a thickness that is relatively small versus the overall longitudinal length of the flange portion 42. The flange portion 42 extends upwardly from a mid-point of the contact surface 47 of the slide member 16, thereby splitting the contact surface into a pair of contact surfaces located on either side of the flange portion 42, as shown in FIG. 6. It should be understood that the flange portion 42 can extend from a mid-point anywhere between the lateral edges of the base portion 46, and does not have to be centrally located. Formed at spaced positions along the length of the flange portion 42 are a plurality of spurs 56 which may be defined by reduced areas therebetween. The spurs 56 are preferably designed to frictionally engage the inner surface of the joined plates 28, 30 of the upper seat track member 12. Additionally, the spurs 56 provide structural stability for the flange portion 42 against lateral forces on the flange surface.

Extending upwardly from the flange portion 42 at a generally central position along the length of the slide member 16 is the generally rectangular stepped portion 48. The stepped portion 48 preferably directly engages the upper track member 12, described below, to fix the slide member 16 to the upper seat track member 12. The stepped portion 48 can be of any design such that the stepped portion 48 frictionally or lockingly engages the upper seat track member 12. Preferably, a protrusion 38 on the stepped portion 48 engages one of the recesses 36 on the upper seat track member 12. It is further preferred that a pair of oppositely opposing protrusions 38 extend from both sides of the stepped portion 48 to engage a recesses 36 on both sides of the upper seat track 12. In a further preferred embodiment, there are a plurality of protrusions 38, 39 extending from the stepped portion 48 such that any one of said protrusions 38, 39 can engage the recesses 36 of the upper seat track 12. The protrusions 38 or 39 extend into the recesses 36 thereby preventing the stepped portion 48 and the remainder of the slide member 16 from moving relative to the upper seat track member 12, thereby fixing the slide member 16 relative to the upper seat track member 12. The protrusions 38, 39 can have any suitable complimentary shape for engaging the recesses 36. For example, the protrusions 38, 39 can include ramped portions 38a and 39a for ease of insertion of the stepped portion 48 into the recess 35 of the upper track The central area of the stepped portion 48 further defines one or more recesses 60 formed in the upper surface therein, and specifically the recesses 60 are located in the spaces between the pairs of opposed protrusions 38, 39. This allows portions of the material of the protrusions 38, 39 to be deformed or deflected and moved within the interior of the stepped portion 48 defined by the recesses 60 to provide clearance as the stepped portion 48 is installed onto the upper seat track member 12. The protrusions 38 are shown in the deformed position by dashed lines in FIG. 6. Once the protrusions 38, 39 are positioned adjacent the recesses 36, the protrusions 38, 39 are free to deflect back to normal position within the recesses 36. Thus, the slide member 16 can be "snap-fit" and locked onto the upper seat track member 12. By the use of a pair of protrusions, the protrusions 38, 39 can be squeezed together towards and generally into a respective recess 60 and will springingly release to engage the recesses 36 of the upper seat track 12. The protrusions 38, 39 therefore preferably are shaped to engage the recesses 36 of the upper seat track member 12. Alternatively, one or more of the protrusions 38, 39 can also frictionally engage the inner surface of the plates 28, 30 that form the walls of the recess 35 of the upper seat track member 12. In a further preferred embodiment, a first pair of protrusions 38 engage the recesses 36 of the upper seat track member 12, while the second pair of protrusions 39 frictionally engage the inner surface of the upper seat track member 12.

Figure 2:
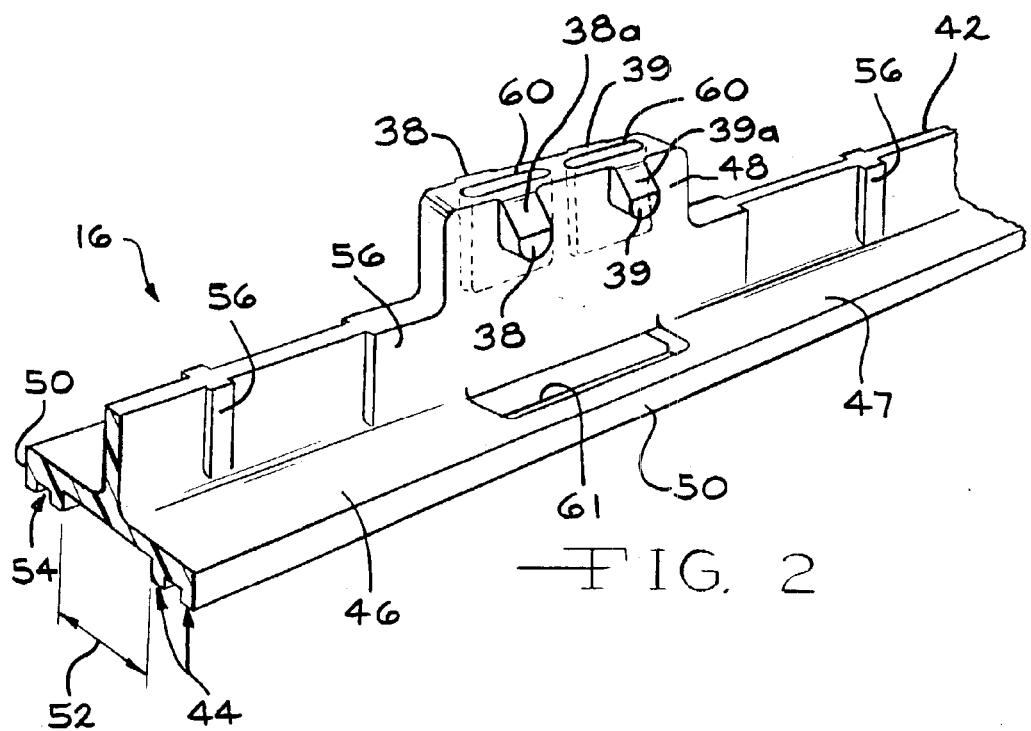
FIG. 2 is a perspective view of a portion of the seat track slide member in accordance with the invention.

Shown in FIG. 3, is a side elevation view of the slide member 16 of FIG. 2. The recesses 60 of the stepped portion 48 are shown by dashed lines indicated generally at 60. The recesses 60 can have any suitable shape and can be located at any suitable position relative to the protrusions 38, 39. The protrusions 38 are located at the top of the stepped portion 48, positioned about the recesses 60 of the stepped portion 48. Shown in greater detail is the cut-out portion 52 between the opposed pair of feet 50 of the body portion 46 of the slide member 16. Also shown, by hidden lines, are the cut-out areas 54 within the longitudinally extending feet 50.

Figure 4:
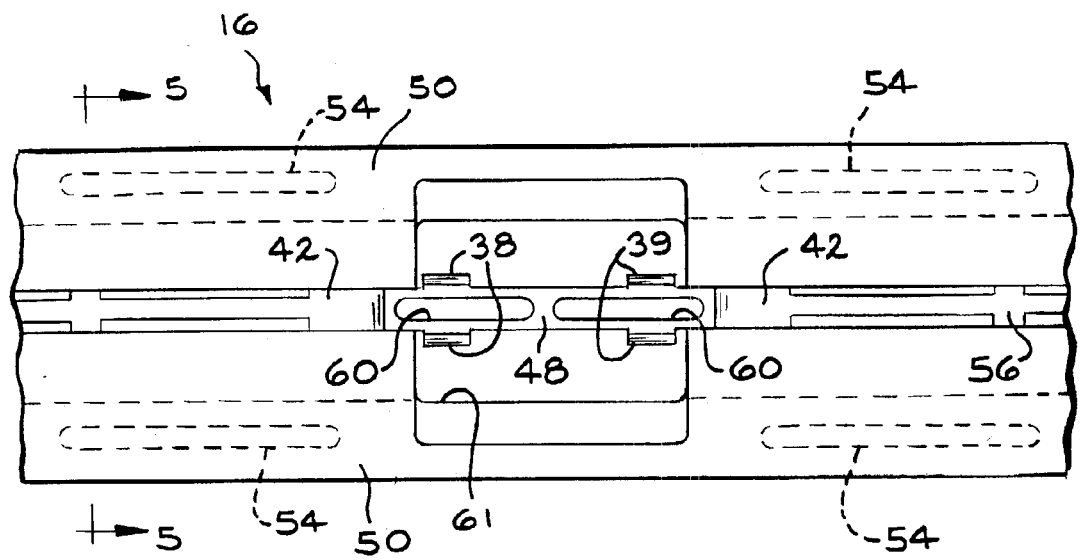
FIG. 4 is a plan view of the portion of the track slide member illustrated in FIG. 2.

Shown in FIG. 4 is a plan view of the slide member 16. The cut-out areas 54 within the longitudinally extending feet 50 can be seen as preferred elongated slots located on the base portion 46 of the slide member 16.

The slide member 16 can be sized to extend the entire length of the upper and/or lower seat track members 12 and 14, or can have a length which is shorter than the lengths of the upper and/or lower seat track members 12 and 14 and is preferably centrally positioned thereon. In the preferred embodiment, the seat track assembly 10 includes a single slide member 16. The term "single slide member" as used herein should be understood to mean a one piece unitary member, as viewed through a cross-section of the seat track assembly 10, such as FIG. 6. It will be appreciated that the slide member 16 can extend along the substantial entire length of the seat track or multiple "single" slide members can be positioned along the length of the seat track assembly 10 spaced apart from one another.

The slide member 16 may also include a pair of through slots 61 as best shown in FIGS. 2 and 6 for permitting various tools or components (not shown) of the seat access through the slide member 16. The slots 61 may also function as guide windows or tool access ports for ease of installation of the slide member 16 onto the upper seat track member 12. Although the slots 61 are shown adjacent the stepped portion 48 they can be located at any location along the length of the slide member 16.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A seat track assembly comprising:

a first track member;

a second track member defining a first recess; and a single slide member disposed between said first and second track members, said slide member having an integral flange extending therefrom wherein said flange is adapted to engage said first recess for fixing said slide member relative to said second track member;

wherein said slide member has a contact surface engaging said second track member, and a sliding surface in sliding engagement with said first track member, said slide member having a generally invert T-shaped cross-section defining a generally horizontal extending member having said sliding surface and fixedly secured to said second track member, said inverted T-shaped cross-section further defining said integral flange extending upwardly from said generally horizontally extending member; and said flange extends from a midpoint of said contact surface such that portions of the contact surface are located on either side of the flange.

2. The seat track assembly defined in claim 1 wherein there are at least two separate sliding surfaces in sliding engagement with the first track member.

3. The seat track assembly defined in claim 2 wherein the slide member further comprises longitudinally extending feet defining said at least two sliding surfaces.

4. The seat track assembly defined in claim 1 wherein a plurality of spaced apart single slide members are positioned along the length of the first and second track members.

5. The seat track assembly defined in claim 1 wherein said flange further defines a stepped portion, said stepped portion adapted to engage the second track member.

6. The seat track assembly defined in claim 5 wherein the stepped portion comprises a protrusion that extends from the stepped portion.

7. The seat track assembly defined in claim 6 wherein the protrusion is adapted to engage the second seat member.

8. The seat track assembly defined in claim 7 wherein the second seat member comprises a second recess, and wherein the protrusion is resiliently disposed in said second recess for fixing said slide member to said member.

9. The seat track assembly defined in claim 8 wherein the stepped portion further defines a third recess adjacent said protrusion, and wherein a portion of said protrusion is temporarily resiliently disposed in said third recess during installation of said slide member in said first recess.

10. The seat track assembly defined in claim 5 wherein the stepped portion comprises a pair of oppositely opposing protrusions.

11. The seat track assembly defined in claim 10 wherein the pair of oppositely opposing protrusions engage the second seat track.

12. The seat track assembly defined in claim 11 wherein the second seat track comprises a pair of second recesses, and wherein the pair of protrusions are resiliently disposed in said second recesses for fixing said member to said second track member.

13. The seat track assembly defined in claim 11 wherein the stepped portion further defines a third recess between said protrusions, and wherein a portion of said protrusions are temporarily resiliently disposed in said third recess during installation of said slide member in said first recess.

14. A seat track assembly comprising:

a first track member;

a second track member defining a first recess and a pair of second recesses;

a single slide member disposed between the first and second track members, the slide member having an integral flange extending therefrom engaging the first recess;

a stepped portion extending from the flange, the stepped portion further comprising two pairs of oppositely opposing protrusions wherein the pair of protrusions are resiliently disposed in the pair of second recesses and the second pair of protrusions engage inner walls of the second track member for fixing the slide member to the second track member;

a third pair of recesses adjacent the first and second pair of protrusions respectively, wherein a portion of the protrusions are temporarily resiliently disposed in the third recesses during installation of the slide member in the first recess; and the slide member further comprising a contact surface engaging the second track member and a sliding surface in sliding engagement with the first track member, wherein the slide member further comprises a pair of longitudinally extending feet defining the sliding surface.

15. A seat track assembly comprising:

a first track member;

a second track member defining a first recess; and a single slide member disposed between the first and second track members, the slide member having an integral flange extending therefrom wherein the flange is adapted to engage the first recess for fixing the slide member relative to the second track member;

wherein the slide member has a contact surface engaging the second track member, and a sliding surface in sliding engagement with the first track member; and the flange extends from a midpoint of the contact surface such that portions of the contact surface are located on either side of the flange, the flange further defining a stepped portion, the stepped portion being adapted to engage the second track member.

16. The seat track assembly defined in claim 15 further comprising a protrusion extending from the stepped portion;

wherein the protrusion formed on the stepped portion is adapted to engage the second track member.

17. The seat track assembly defined in claim 16 wherein the second seat track member further comprises a second recess, and wherein the protrusion is resiliently disposed in the second recess for fixing the slide member to the second track member.

18. The seat track assembly defined in claim 16 wherein the stepped portion further defines a third recess aduacent the protrusion, and wherein a portion of the protrusion is temporarily resiliently disposed in the third recess during installation of the slide member in said first recess.

19. The seat track assembly defined in claim 15 wherein the stepped portion comprises a pair of oppositely opposing protrusions, the pair of oppositely opposing protrusions engaging the second seat member.

20. The seat track assembly defined in claim 19 wherein the second track member comprises a pair of second recesses, and wherein the pair of protrusions are resiliently disposed in the second recesses for fixing the slide member to the second track member; and wherein the stepped portion further defines a third recess between the protrusions, and wherein a portion of the protrusions are temporarily resiliently disposed in the third recess during installation of the slide member in the first recess.

* * * * *

UNITED STATES PATENT AND TRADEMARK OFFICE
CERTIFICATE OF CORRECTION

PATENT NO. : 6,886,797 B2
DATED : May 3, 2005
INVENTOR(S) : Keith McCullen et al.

It is certified that error appears in the above-identified patent and that said Letters Patent is hereby corrected as shown below:

Column 6,
Line 18, delete "invert" and insert -- inverted --;
Line 19, delete "horizontal" and insert horizontally --.
Lines 43 and 45, delete "seat" and insert -- track --.
Line 47, after the second "said" insert -- second track --.
Line 62, after the second "said" insert -- slide --.

Column 7,
Line 12, after "the" insert -- first --.

Column 8,
Line 24, delete "seat" and insert -- track --.

Signed and Sealed this

Twenty-eighth Day of June, 2005

JON W. DUDAS
*Director of the United States Patent and Trademark Office*